United States Patent
Fukushima et al.

(10) Patent No.: US 6,940,677 B2
(45) Date of Patent: Sep. 6, 2005

(54) WRITING DISTINCT SERVO PATTERNS ON INDIVIDUAL TRANSDUCERS ACCORDING TO TRANSDUCER READ/WRITE HEAD CHARACTERISTICS IN A DATA STORAGE DEVICE

(75) Inventors: Craig N. Fukushima, Monte Sereno, CA (US); Scott A. Thomas, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 10/261,873

(22) Filed: Oct. 1, 2002

(65) Prior Publication Data

US 2004/0061968 A1 Apr. 1, 2004

(51) Int. Cl.[7] .............................................. G11B 21/02
(52) U.S. Cl. ..................... 360/75; 360/77.06; 360/77.08
(58) Field of Search ............................. 360/40, 48, 57, 360/75, 77.01, 77.02, 77.08, 76, 77.06

(56) References Cited

U.S. PATENT DOCUMENTS

| | | | | |
|---|---|---|---|---|
| 5,946,157 A | * | 8/1999 | Codilian et al. | 360/75 |
| 6,002,541 A | | 12/1999 | Belser et al. | 360/77.08 |
| 6,057,977 A | | 5/2000 | Cunningham | 360/77.08 |
| 6,078,461 A | | 6/2000 | Smith et al. | 360/77.08 |
| 6,091,567 A | | 7/2000 | Cooper et al. | 360/77.08 |
| 6,094,320 A | | 7/2000 | Ahn | 360/77.04 |
| 6,519,107 B1 | * | 2/2003 | Ehrlich et al. | 360/75 |
| 6,522,493 B1 | * | 2/2003 | Dobbek et al. | 360/75 |
| 6,628,471 B1 | * | 9/2003 | Min et al. | 360/75 |
| 2003/0179482 A1 | * | 9/2003 | Fukushima | 360/48 |

OTHER PUBLICATIONS

IBM, TDB v38 n6 06–95 p241–242; Improved Dedicated Servo Pattern for Rigid Disk Magnetic Storage Systems.
IBM, TDB v38 n6 06–95 p345–346; Seamless Servowriting for High–Track Density Magneto–Resistive Sector Servo System.

* cited by examiner

Primary Examiner—David Hudspeth
Assistant Examiner—Jason Olson
(74) Attorney, Agent, or Firm—Walter W. Duft

(57) ABSTRACT

Distinct servo patterns are written on data storage media of a data storage device. Servo patterns of a first type are written for transducers of the data storage device having a first transducer characteristic. Servo patterns of a second type are written for transducers that do not have the transducer characteristic. The transducer characteristic can be a geometric criterion such as read head and write head track width, an operating characteristic such as frequency response, or otherwise. The first servo pattern may be a seamless untrimmed PES burst and the second servo pattern may be a seamed trimmed PES burst.

29 Claims, 11 Drawing Sheets

WRITING DISTINCT SERVO PATTERNS ON INDIVIDUAL TRANSDUCERS ACCORDING TO TRANSDUCER READ/WRITE HEAD CHARACTERISTICS IN A DATA STORAGE DEVICE

BACKGROUND OF THE INVENTION

1. Field of the Invention

The present invention relates to data storage devices of the type that store data on the surfaces of magnetic disk media. More particularly, the invention relates to a system and method for writing servo patterns within the servo regions of data storage media adapted for use in such apparatus.

2. Description of the Prior Art

By way of background, magnetic disk-based storage systems, such as the disk drive 2 of FIG. 1, use servo control systems to maintain highly accurate positional relationships between the transducers 4 that read and write data, and the disk surfaces 6 where the data is stored in a plurality of tracks 8. The servo control system periodically monitors the position of whichever transducer 4 has been selected for active data read/write operations, and makes necessary positional adjustments by providing control signals to a motor that pivots a transducer-carrying actuator 10.

A conventional disk drive servo control system includes servo control logic (within the drive controller 12) that processes servo information read from the disk surface 6 into positioning information that is used to produce the required control signals. The servo information is commonly recorded in servo sectors that are interspersed with data regions of the tracks 8 that store customer data. This is sometimes referred to as sector servo recording, and is performed by the disk drive manufacturer prior to final drive assembly in an operation known as servo writing. Because the servo sectors are generally placed at the same circumferential locations on each track, they tend to be aligned in servo regions that extend in a cross-track direction. FIG. 1 shows three such regions 14. Typically, there are multiple (e.g. 80–90 or more) servo regions per disk surface, with each servo region being separated by a customer data region.

As can be seen in FIG. 2a, the servo sectors that comprise the servo regions of a disk drive contain various information fields, including a write recovery/leading timing gap, an automatic gain control field (AGC), a servo timing mark (STM), a track-ID field (TID), a position error signal field (PES), and a trailing timing gap. The timing gaps serve to separate the servo sectors from the surrounding data regions. The AGC field is used to set the servo gain and clocking in the servo control logic to allow the reading of the subsequent servo information. The STM provides bit alignment for reading the subsequent servo information. The TID field typically records the track number (coarse position) and other digital information, such as sector number, index and head number. The PES field is designed to provide fine track positioning information.

As shown in FIG. 2b, a conventional PES field contains a pattern of analog servo bursts that are used to determine transducer position relative to a track centerline. There are typically four servo bursts in each servo pattern that are arranged in what is commonly referred to as a "quad burst pattern." The servo bursts, which are labeled, "A," "B," "C" and "D" in FIG. 2b, are offset from each other relative to the track centerline, and are also spaced in the circumferential trackwise direction. During fine track servo positioning, read back signals produced by the servo bursts are demodulated and compared to generate a position error sensing (PES) signal. Typically, there are two PES signal components, namely, a primary signal component called "P" and a quadrature signal component called "Q," each being 90° out of phase with the other.

With respect to the readback signal generated when the transducer is over the A, B, C or D servo bursts, the primary P signal component is typically formed by calculating the difference in signal strength between the A and B read back signals according to the relationship P=A−B. Similarly, the quadrature Q signal component is typically formed by calculating the difference in signal strength between the C and D read back signals according to the relationship Q=C−D. The point at which the P and Q signal components are zero (i.e., the read back signals from each burst are of equal strength) is referred to as the "burst centerline" because it represents the physical centerline between the two bursts that comprise the signal. In other words, P=0 is the centerline between the A and B bursts, and Q=0 is the centerline between the C and D bursts. As exemplified by FIG. 2b, the A and B bursts are typically recorded so that their burst centerline corresponds to a track centerline. Similarly, the C and D bursts are typically recorded so that their burst centerline is halfway between the centerlines of two adjacent tracks (i.e., at ½ track pitch offsets).

The PES signal is generated by alternating between the P and Q components according to which one is more linear (based on transducer position in the trackwise direction) to provide a PES signal with the greatest linearity. Thus, when a transducer is at or near a track centerline, the P signal component (A−B) will be used. When the transducer is at or near a ½ track offset position, the Q signal component (C−D) will be used. Generally speaking, the cutoff point for transitioning between the P and Q signal components is when the transducer is half way between these two positions, which corresponds to the transducer being offset ¼ track on either side of a track centerline.

As indicated, the above mentioned servo patterns are recorded during disk drive manufacture in a process known as servo writing. More particularly, each transducer is used to write its own servo information that will later be used to position the transducer during read/write operations. Before describing this process in more detail, it will be helpful to review the construction of a conventional disk drive transducer. As shown by FIGS. 3–6, a typical transducer T includes an inductive write head element W for writing data and a magneto-resistive read head element R for reading data. The write head W includes a pair of soft ferromagnetic film layers P1 and P2 that extend from a back gap area BG to an ABS (Air Bearing Surface) that is adapted to magnetically interact with the disk's recording surface. There, the P1 and P2 layers respectively form pole tips PT1 and PT2. The pole tips are separated by an insulative gap layer G3 that defines the head's write gap. An electromagnetic coil structure C is sandwiched between the P1 and P2 layers to define the yoke portion of the write head W. The yoke extends from the back gap BG to the pole tips PT1 and PT2. Insulative layers I1, I2 and I3 electrically insulate the coil structure C from the P1 and P2 layers.

During write operations, electrical current passing through a pair of electrical leads E1 and E2 to the coil C generates a magnetic field that induces a magnetic flux in the P1 and P2 layers. As shown in FIG. 5, this magnetic flux propagates from the yoke to the pole tips PT1 and PT2, where it fringes across the G3 gap layer. This causes magnetic domains to be formed on the underlying recording surface. The orientation of each recorded magnetic domain is dependent on the magnetization direction of the pole tips PT1 and PT2, which in turn is determined by the direction of the electrical current passing through the coil C. Reversing the coil's electrical current reverses the magnetization direction of the pole tips PT1 and PT2, and consequently reverses the orientation of the next recorded magnetic domain. This magnetization reversal process is used to encode data on the recording surface.

The read head R lies between a pair of insulative G1 and G2 gap layers at the ABS. It is typically formed as a layered structure having magneto-resistive properties. An electrical sense current passing through the read head R will thus be modulated by the magnetic domains formed by the write head W, which induce alterations of the magnetic and electrical properties of the read head.

FIG. 6 depicts the transducer T from the vantage point of the disk surface so as to illustrate the track width dimensions of the write head W and the read head T. The write head track width (Tw) determines the width of the magnetic domains that are written on the disk surface. The read head track width (Tr) is optimized to allow the read head R to sense the magnetic domains written by the write head W with good signal-to-noise ratio. Generally speaking, the write head track width Tw is designed to be approximately 80% of the track pitch Tp between adjacent track centerlines.

A common way to record servo patterns is to form each servo burst using several passes of the transducer write head, with the write head being stepped at sub-track pitch increments (such as one-half the track pitch or less) for each pass. According to this approach, a first "burst stripe" of a servo burst is written by the write head, and then the transducer is stepped by ½ track (or less) to write the next burst stripe of the servo burst. The transducer is then stepped another ½ track increment (or less) and the bottom radial (trackwise) edge of the servo burst is erased in a process known as trimming. Servo patterns produced in this manner are commonly referred to as "seamed trimmed" patterns.

In the interest of controlling TMR, various seamless untrimmed servo patterns have been proposed. In modern high track density disk drives, this typically means using what is known as a "seamless untrimmed" servo burst pattern in which each servo burst is written in a single pass at the width of the write head. When implemented in a half-track pattern in which adjacent servo bursts are radially offset from each other by ½ track, this can reduce servo writer-induced TMR up to two times.

Seamless untrimmed servo patterns are thus generally preferred over seamed trimmed servo patterns. However, this assumes that all transducers are alike, when in fact there can be significant tolerances producing head geometries that are not compatible with seamless untrimmed servo patterns. Transducers having read and write heads that are both relatively narrow relative to track pitch (Tp) are particularly problematic when used with seamless untrimmed servo patterns. In that case, the narrow write head will write narrow servo bursts, which produces excessive radial gaps between adjacent servo bursts. If the gaps are wide enough relative to the narrow read head, the read head could miss both servo bursts when positioned over a burst pair centerline such that no useful PES signal is obtained. Transducers having wide write heads and narrow read heads can also experience problems. In this case, the wide write head will write wide servo bursts. If the read head is narrow enough relative to the wide servo bursts, the read head could pass over a servo burst when positioned between burst pair centerlines without seeing an edge of the burst. This saturates the read head such that no useful PES signal is obtained. Both of the foregoing conditions may be referred to a "flat-topping" because the slope of the P and Q signals as a function of read head radial position becomes zero or flat. When flat-topping occurs, any change in read head position will produce no corresponding change in PES signal, such that accurate servo positioning becomes impossible.

FIG. 7 is illustrative. It shows four servo bursts A, B, C, and D servo bursts that are each one track pitch wide (Tw=Tp), and a read head that is also one track pitch wide (Tr=Tp). The graph at the lower portion of FIG. 7 shows the phase differentiated PES signal components based on P=A−B and Q=C−D. The superimposed dark lines in the graph show the point at which the P and Q signal components are used for read head positioning as the read head move radially across the disk. In particular, the P=A−B signal component is used when the read head is centered near the track centerlines (e.g., TK 0, TK 1, TK 2, TK 3, etc.) and the Q=C−D signal component is used when the read head is centered between tracks. As described above, the transition point between the P and Q signal components is when the read head is offset ¼ track from a track centerline. Note that the PES signals are relatively linear between the ¼ track offset locations, such that a given change in signal strength corresponds to a readily determinable change in transducer position.

It can be seen from FIG. 7 that if the read and write head track widths Tr and Tw are small enough, that there will be radial positions at which the read head could become lost between servo bursts separated by wide gaps. Similarly, if the read head track width Tr is small in comparison to the write head track width Tw, there will be radial positions at which the read head becomes saturated by a servo burst.

The foregoing head incompatibility problems have increased in recent years as a result of reductions in track pitch, which have outpaced the ability to reduce manufacturing tolerances. A larger number of head geometries are thus subject to higher PES nonlinearities when used with seamless untrimmed servo patterns. Because the prevailing wisdom is to select a single servo pattern for use with all heads, it has become more difficult to select a nominal servo pattern design point that will work for all heads.

Although linearization processes have been proposed to address the PES nonlinearity problems, the flat-top problem cannot be cured by these methods. The reality is that when untrimmed servo burst patterns are used, there will always be certain transducers produced during a given manufacturing run that are simply unsuitable for use. A solution to this problem is therefore needed so that transducers which would have previously been rejected may now be considered for use in disk drive products.

SUMMARY OF THE INVENTION

Applicants have observed that transducers which are unsuitable for use with seamless untrimmed servo burst patterns can in many cases be used with seamed trimmed servo burst patterns. Applicants have further observed that other servo pattern characteristics, such as burst signal frequency, are better suited to some transducers than to others. The foregoing problems can therefore be solved, and an advance in the art obtained, by writing distinct or customized servo patterns in a data storage device according to measured transducer characteristics. In particular, servo patterns of a first type can be written for transducers having a defined transducer characteristic, while servo patterns of a second type can be written for transducers that do not have the transducer characteristic. The first servo pattern could be a TMR-reducing seamless untrimmed servo burst pattern that is used for transducers which operate satisfactorily with such patterns, and the second servo pattern could be a seamed trimmed servo burst pattern that is used for transducers which will not operate satisfactorily with the seamless untrimmed pattern, but will produce acceptable servo operation results with the seamed trimmed pattern. The defined transducer characteristic could be a geometric criterion such as track width. Other transducer characteristics, such as a frequency response, may also be used to select a particular servo pattern for the transducer. Thus, by measuring the physical or operating characteristics of transducers produced during a manufacturing run, an appropriate servo burst pattern can be selected for each transducer. This will improve upon yield losses caused by transducers that do not work well with certain servo patterns.

The measured transducer characteristic will typically be based on the ability of the transducers to obtain accurate positioning when reading servo patterns of the first type. In particular, the transducer characteristic may be geometric criterion based on a track width (Tr) of a read head portion of a transducer relative to a track width (Tw) of a write head portion of a transducer used to write the servo patterns. The read head track width Tr must be of a size relative to the write head track width Tw such that the head can obtain accurate positioning information from servo patterns of the first type at all transducer radial positions. To obtain such accurate positioning information, the read head track width Tr should be of a size relative to Tw such that the read head encounters a radial edge portion of at least one servo burst in a servo sector at all radial positions of the read head relative to a track centerline. When positioned over the track centerline, the read head should thus be wide enough to span a radially extending gap between the servo bursts of a servo burst pair. Similarly, when the read head is offset from the track centerline, particularly at one-quarter track pitch, the read head should be wide enough so as not to be saturated by any servo burst of a servo burst pair.

The invention further proposes the use of nonlinear compensation of servo signals read from the first servo pattern type for any transducer having a read head of track width (Tr) that is not large enough to satisfy a condition of spanning both respective burst centerline edges of a servo burst pair at all transducer positions.

The invention also contemplates data storage devices having distinct servo patterns in accordance with the foregoing method, and a servo-write method that allows distinct servo patterns to be written at maximum efficiency in a disk drive production environment.

BRIEF DESCRIPTION OF THE DRAWINGS

The foregoing and other features and advantages of the invention will be apparent from the following more particular description of exemplary embodiments of the invention, as illustrated in the accompanying Drawings, in which:

FIG. 2b shows a detailed disk surface view of servo burst patterns in the disk drive track of FIG. 2a;

FIGS. 9a, 9b, 9c and 9d are detailed disk surface views of four separate servo burst pattern geometries in which FIG. 9a illustrates a seamed trimmed servo burst pattern and FIGS. 9b, 9c and 9d illustrate seamless untrimmed servo burst patterns;

DETAILED DESCRIPTION OF PREFERRED EMBODIMENTS

Figure 1:
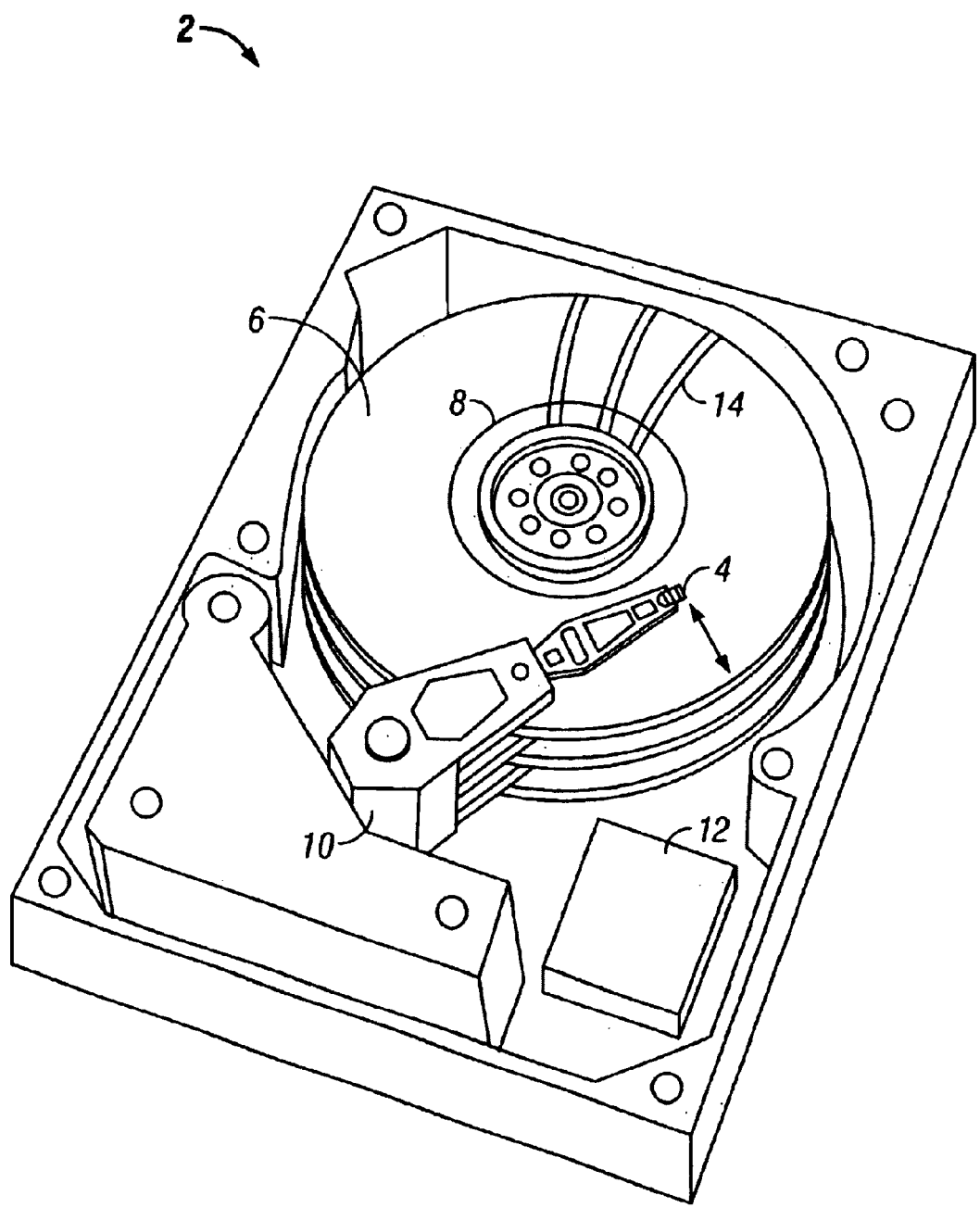
FIG. 1 is a diagrammatic representation of a conventional magnetic disk drive.
Figure 2A:
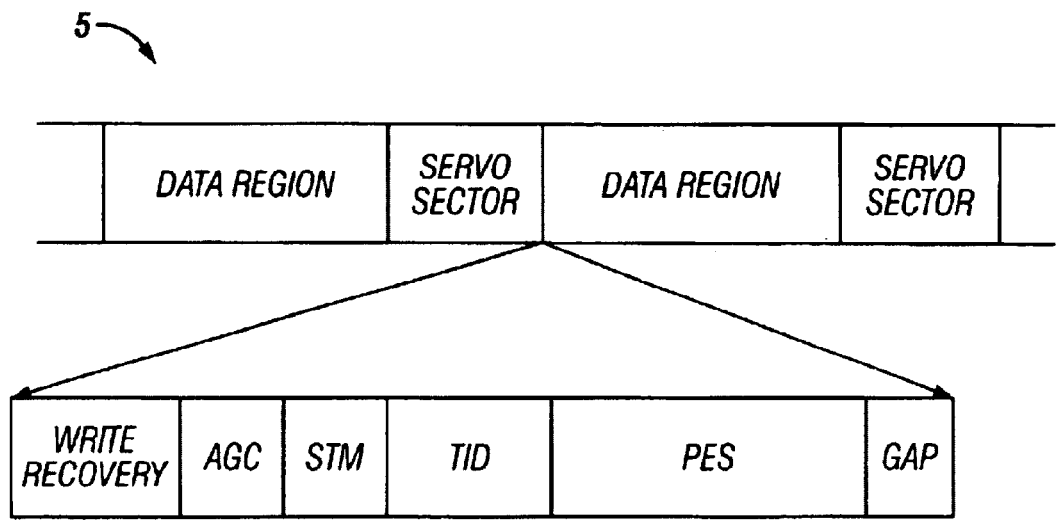
FIG. 2a shows a portion of a conventional disk drive track containing servo sectors and data regions, with an expanded view of a servo sector also being shown.
Figure 2B:
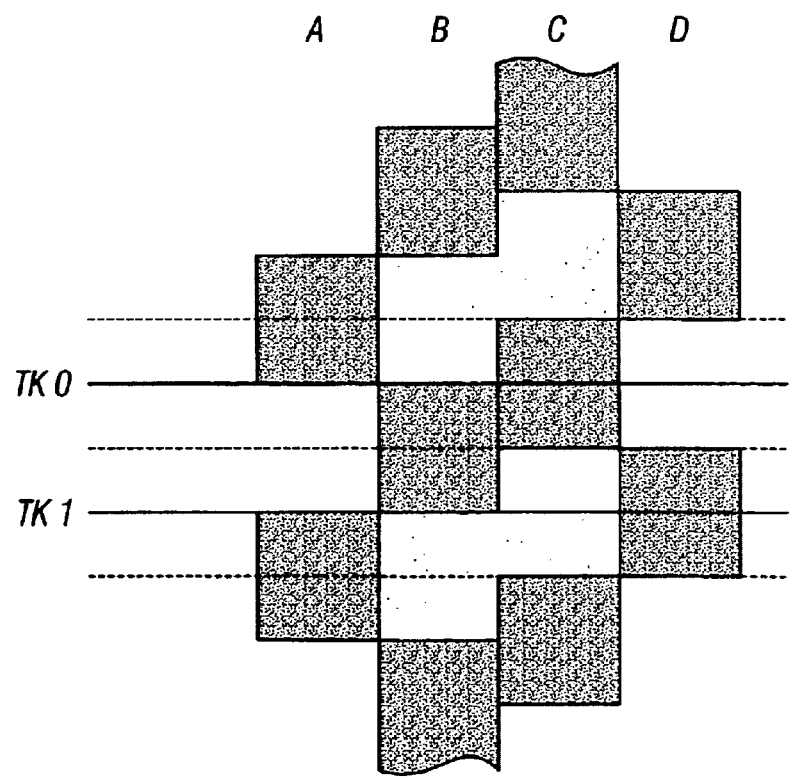
Figure 3:
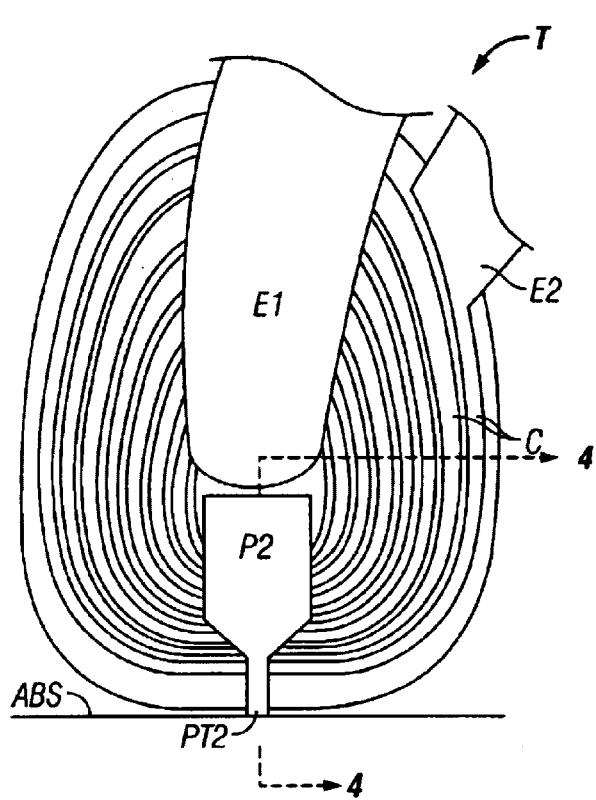
FIG. 3 is a plan view of a conventional magnetic disk drive read/write transducer.
Figure 4:
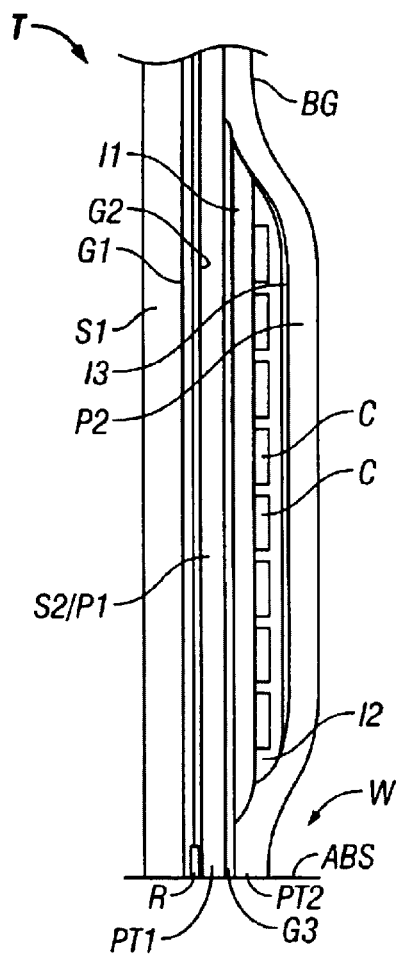
FIG. 4 is a cross-sectional view taken along line 4—4 in FIG. 3.
Figure 5:
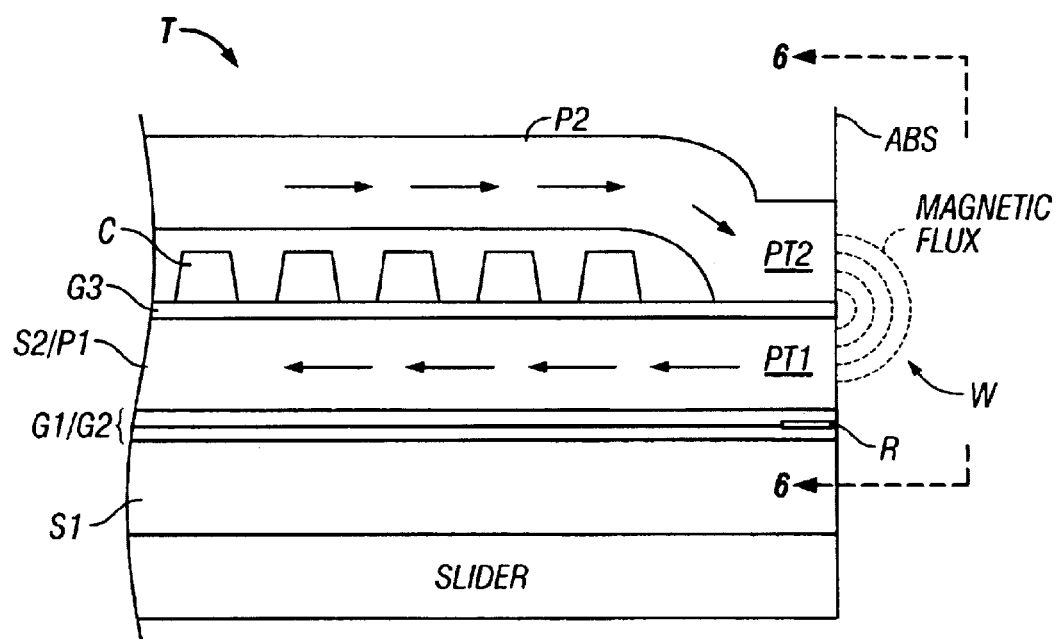
FIG. 5 is an enlargement of the transducer of FIG. 4 showing the transducer near the air bearing surface (ABS) thereof.
Figure 6:
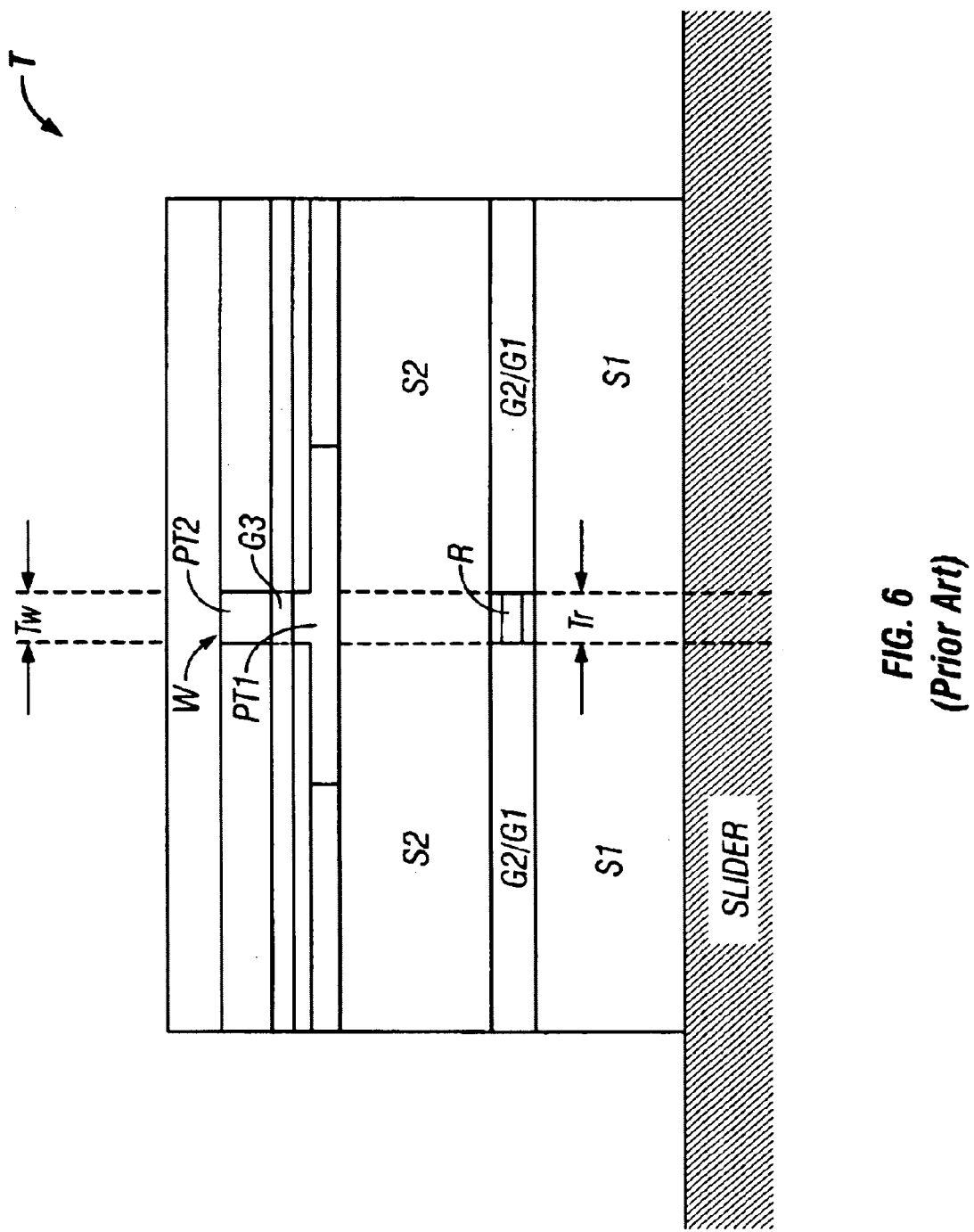
FIG. 6 is an end view taken in the direction of lines 6—6 in FIG. 5.
Figure 7:
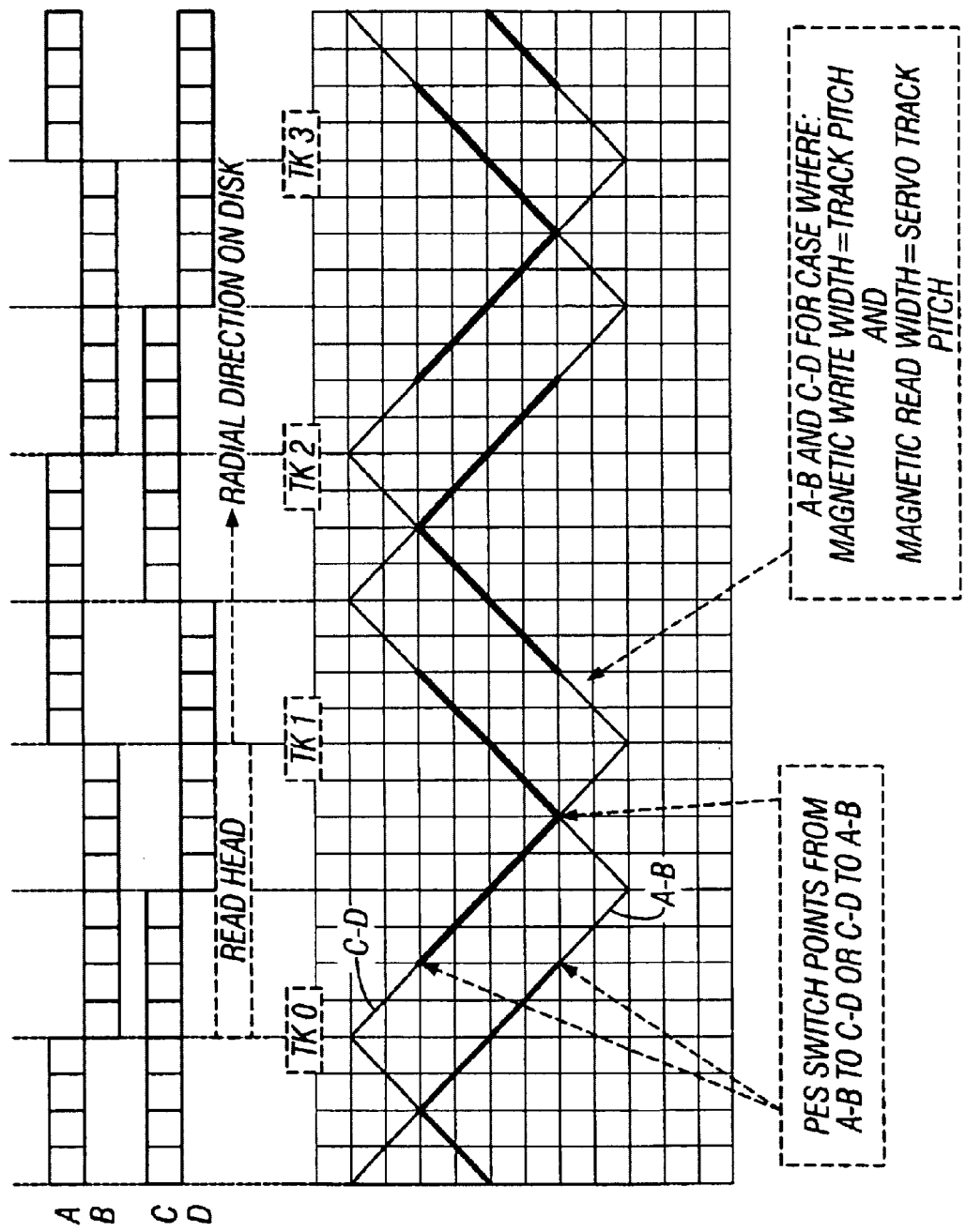
FIG. 7 is a diagrammatic representations of quad burst servo patterns relative to read head track width, and further includes a graph showing PES signal strength as a function of read head radial (trackwise) position relative to the servo bursts.
Figure 8:
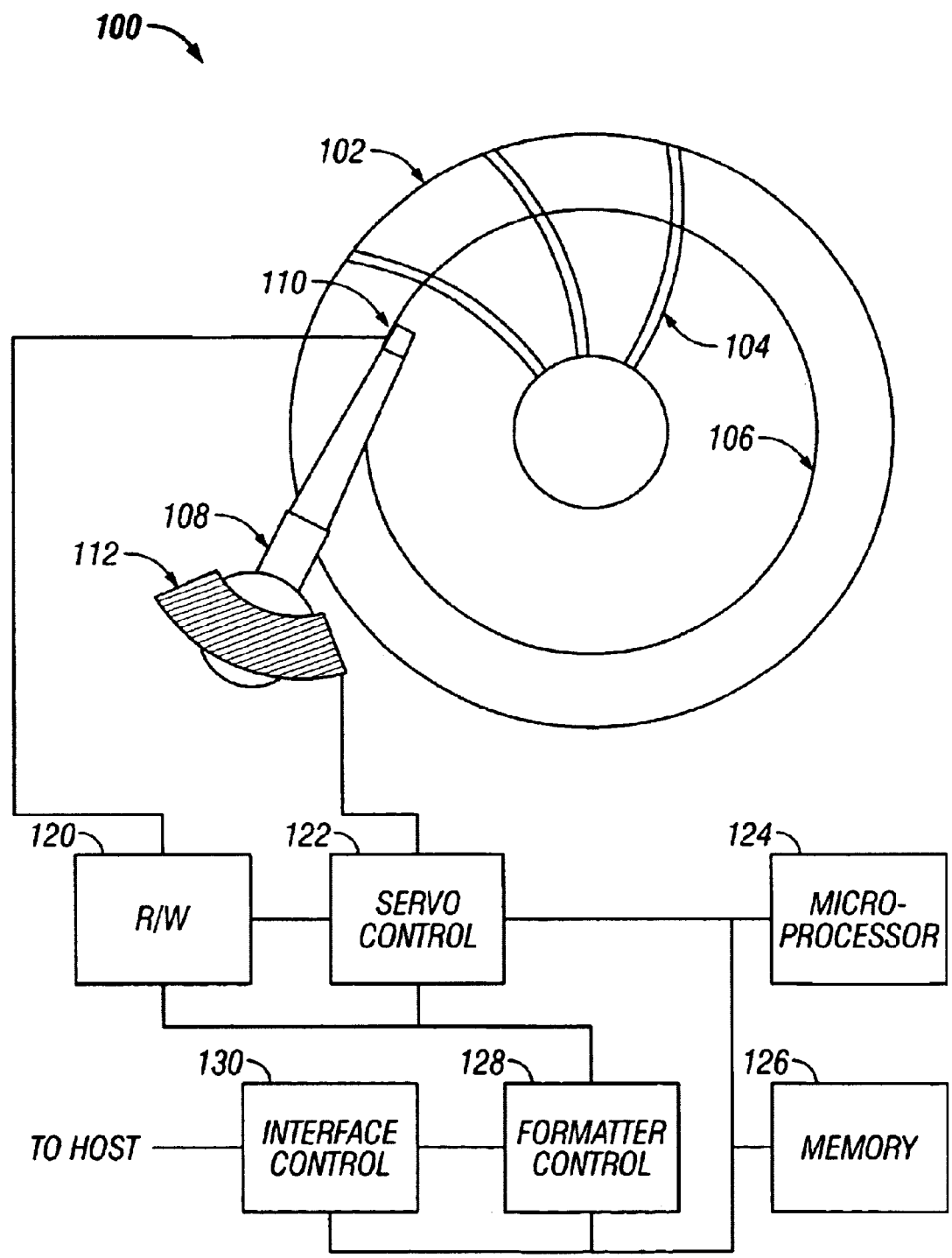
FIG. 8 is a diagrammatic representation of a magnetic disk drive constructed in accordance with the invention.

Turning now to the FIGS. 8–10, wherein like reference numerals represent like elements in all of the several views, the invention will now be described by way of an exemplary embodiment in which FIG. 8 shows a magnetic hard disk drive that is constructed in accordance with the invention. The disk drive, generally indicated at 100, includes a disk 102 whose surface is magnetically encodable and on which servo information is written in servo regions 104. The servo regions 104 extend generally radially across the disk 102, along an arc traced by an actuator 108. Data is stored in data regions on a plurality of concentric tracks, one of which is indicated as 106. The data regions represent the portions of the disk 102 that lie between servo sectors 104.

A pivotable actuator 108 mounts a read/write transducer 110 at its free end. The actuator 108 is rotatably driven by a voice coil motor 112 at its pivotable base end. The disk drive 100 further includes electronics for accessing, reading and writing data on the disk 102 and communicating with a host system (not shown). In particular, a Read/Write channel circuit 120 is coupled to the transducer 110. It also communicates with servo control logic 122 and formatter control logic 128. During drive operation, the servo control logic 122 is adapted to drive the voice coil motor 112 to position the transducer 110 and effect servo operations, such as seek, settle and track follow. The disk drive 100 further includes a microprocessor 124, a memory 126 and interface control logic 130.

Turning now to FIGS. 9a, 9b, 9c and 9d, four PES servo patterns are shown for purposes of illustrating the conditions under which distinct servo patterns may be used to accommodate different transducer geometries in the disk drive 100. As described by way of summary above, the invention contemplates that servo patterns of a first type will be written for transducers that satisfy a defined geometric criterion, while servo patterns of a second type will be written for transducers that do not satisfy the geometric criterion. The first servo pattern is preferably a seamless untrimmed servo burst pattern that is used for transducers that operate satisfactorily with such patterns, and the second servo pattern is preferably a seamed trimmed servo burst pattern that is used for transducers that will not operate satisfactorily with the seamless untrimmed pattern, but will produce acceptable results with the seamed trimmed pattern.

Figures 9A, 9B:
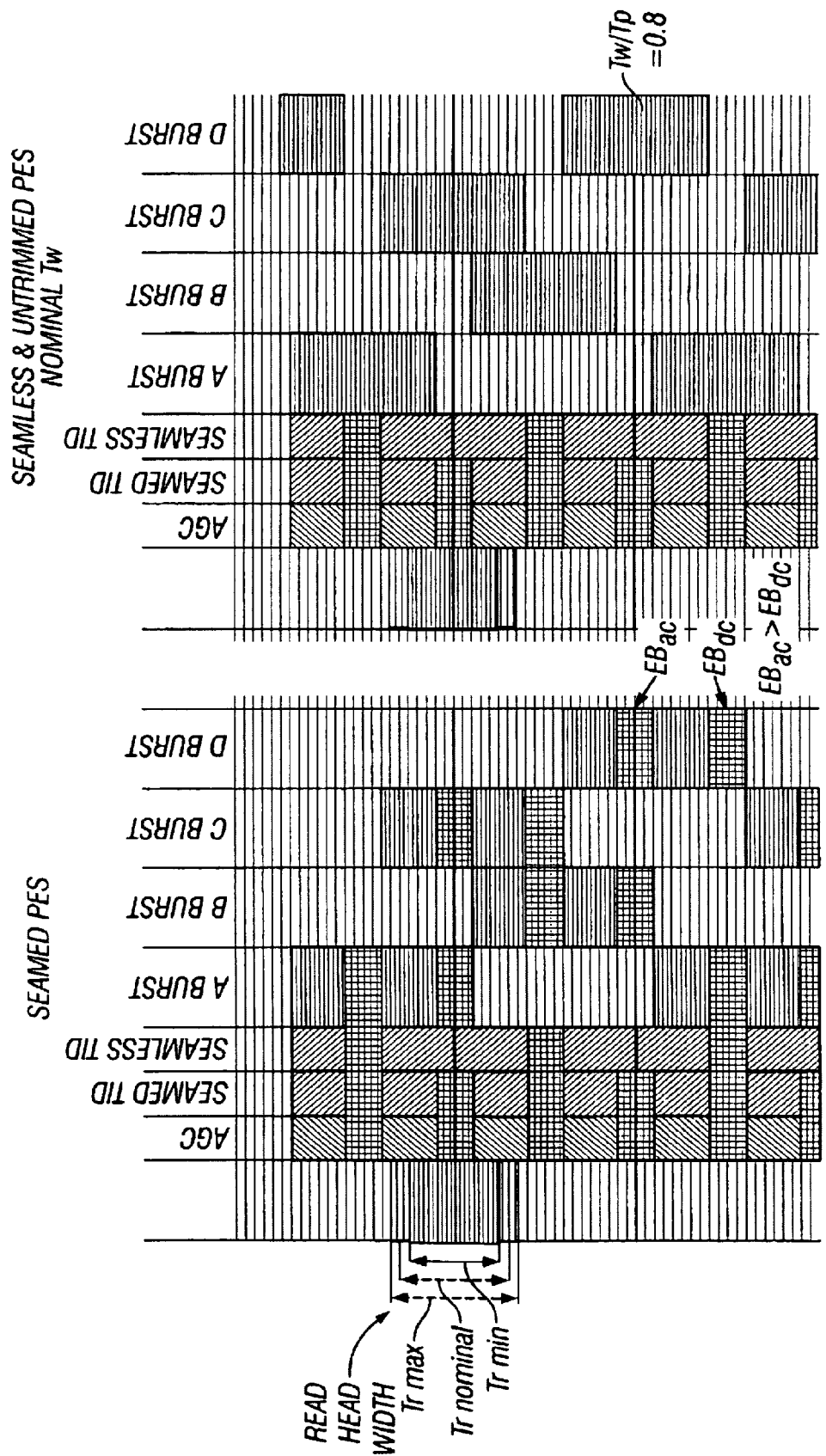

FIG. 9a shows an exemplary seamed trimmed PES pattern. Each of the A, B, C and D burst patterns is written in three passes in successive ½ track increments by an associated transducer write head. Other step increments could also be used, such as ⅓ or ¼ track steps. Although the write head track width Tw is not critical for seamed trimmed servo patterns (see below), the write head used to write the seamed trimmed pattern of FIG. 9a is assumed to have a track width Tw that is 80% of the track pitch Tp, such that Tw=0.8Tp. Note that each track is 20 lines wide in FIG. 9a, so Tw is 16 lines wide.

The burst writing sequence for writing the seamed trimmed servo burst pattern of FIG. 9a is as follows: A first servo write pass forms the upper part of the uppermost A burst. After stepping the write head downwardly ½ track, a second servo write pass is performed to extend the A burst and to form the upper part of the C burst. After stepping the write head downwardly another ½ track, a third servo write pass is performed in which the bottom of the A burst is trimmed by erasing, the upper part of the B burst is formed, and the C burst is extended. After stepping the write head downwardly another ½ track, a fourth servo write pass is performed in which the B burst is extended, the bottom of the C burst is trimmed by erasing, and the upper part of the D burst is formed. After stepping the write head downwardly another ½ track, a fifth servo write pass is performed in which the upper part of the lowermost A burst is formed, the bottom of the B burst is trimmed by erasing, and the D burst is extended. After stepping the write head downwardly another ½ track, a sixth servo write is performed in which the lowermost A burst is extended, the next C burst is started, and the bottom of the D burst is trimmed.

Note that this seaming process produces an a.c. erase band ($EB_{AC}$) through the radial centerline of each burst and a d.c. erase band ($EB_{DC}$) at the bottom edge of each burst. These erase bands are shown by light shading in FIG. 9a, while the remainder of each servo burst is shown by dark shading. Both erase bands will be of a fixed size, with the a.c. erase band being larger than the d.c. erase band. Each a.c. erase band represents an area of moderate PES read back signal degradation. Each d.c. erase band contains no useful PES read back signal and thus reduces the effective radial extent of a seamed trimmed burst. Because the size of the d.c. erase band is very predictable, however, the seamed trimmed bursts are fairly equal in radial size and position. As indicated above, this condition holds even though the write head track width Tw may vary from the nominal size of Tw=0.8 Tp, at least so long as Tw is not less than the ½ track pitch step size used to write the bursts. As a practical matter, any write head which is that narrow would be rejected from consideration for production use.

Figures 9C, 9D:
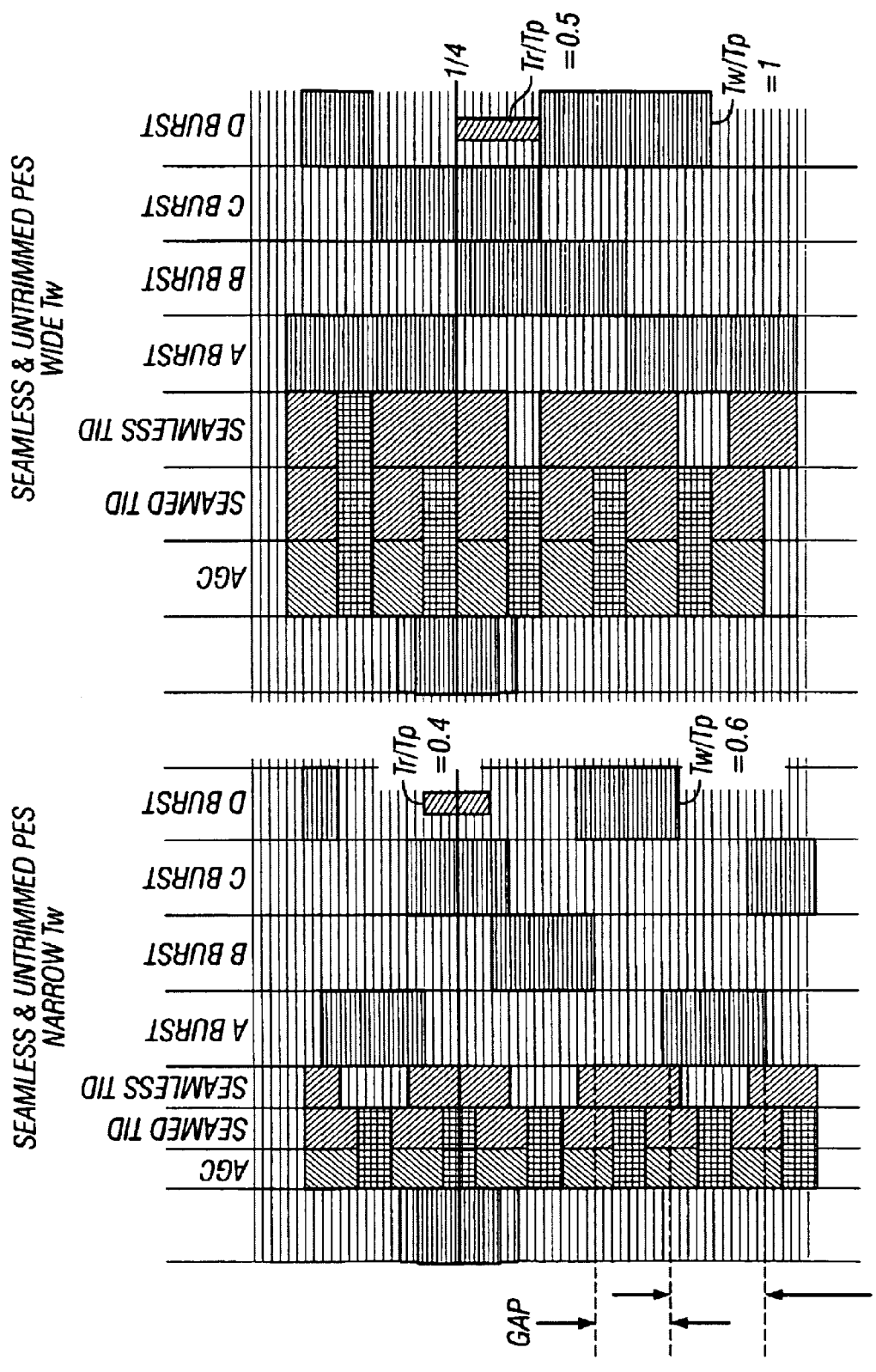

FIGS. 9b, 9c and 9d all depict seamless untrimmed burst patterns. FIG. 9b shows seamless untrimmed bursts written in a single pass of a write head whose track width Tw is at the nominal size of Tw=0.8 Tp. FIG. 9c shows seamless untrimmed bursts written in a single pass of a write head whose track width Tw is less than nominal. In particular, Tw=0.6 Tp. FIG. 9d shows seamless untrimmed bursts written in a single pass of a write head whose track width Tw is larger than nominal. In particular, Tw=Tp. The burst writing sequence for each of the seamless untrimmed burst pattern of FIGS. 9a, 9b and 9c is as follows: A first servo write pass forms the A burst. After stepping the write head downwardly ½ track, a second servo write pass forms the C burst. After stepping the write head downwardly another ½ track, a third servo write pass forms the B burst. After stepping the write head downwardly another ½ track, a fourth servo write pass forms the D burst.

The servo track width of each seamless untrimmed burst in FIGS. 9b, 9c and 9d is based on the write head track width Tw. As described by way of background above, writing seamless untrimmed servo bursts at the write head track width produces servo track width variances that can create problems for certain read heads which vary from a nominal read track width Tr. Thus, for certain transducers there will be problems. The left hand side of FIGS. 9a, 9b, 9c and 9d illustrates an exemplary range of read head track widths, including a nominal Tr of 0.6 Tp, a minimum Tr of 0.5 Tp and a maximum Tr of 0.7 Tp. Linearity and flat top problems tend to arise relative to transducers in which the read head track width Tr is small in comparison to the track pitch Tp and the write head track width Tw is either larger or smaller than nominal.

FIG. 9c illustrates a condition in which the write head track width is smaller than nominal. In particular, the write head has a track width Tw=0.6 Tp. It will be seen that this produces radially extending gaps between the A-B bursts and the C-D bursts. The gaps in this example have a width of 0.4 Tp. This creates a flat topping problem for read heads whose track width Tr is less than or equal to 0.4 Tp and which are positioned at the track centerline. As shown in FIG. 9c, the read head will be lost at this location. It will miss the A, B and D bursts, and will be saturated by the C burst. No useful transducer positioning information will be obtained under these conditions.

FIG. 9d illustrates a condition in which the write head track width is larger than nominal. In particular, the write head has a track width Tw=Tp. This creates a flat topping problem for read heads whose track width Tr is less than or equal to 0.5 Tp and which are offset from the track centerline by ¼ track pitch. As shown in the example, the road head will be lost at this location. It will miss the A and D bursts, and will be saturated by the B and C bursts. No useful transducer positioning information will be obtained under these conditions.

On the other hand, if the read heads of the previous examples are used with the seamed trimmed PES pattern of FIG. 9a, the flat topping problem can be eliminated for all but the smallest read heads. In particular, the A-B gap that a read head would experience at the track centerline in FIG. 9a is 0.2 Tp. As a practical matter, all non-rejected transducers in a transducer production run would be at least this wide, and typically more. At the quarter track offset position in FIG. 9a, the read head would only need to be 0.3 Tp. Again, virtually all non-rejected transducers in a transducer production run would satisfy this requirement.

A generalized geometric criterion will now be set forth that may be used for any transducer geometry to determine when a seamed trimmed servo pattern must be used in order to avoid flat topping and obtain useful servo positioning information. Using the proposed geometric criterion, the physical characteristics of transducers produced during a manufacturing run can be measured, and then the servo pattern written by the transducers during servo writing can be customized to the transducer. This will improve upon yield losses caused by transducers that do not work well with the standard seamless untrimmed servo pattern.

The preferred geometric criterion is based on the read head track width Tr relative to write head width Tw of a transducer used to write its own servo patterns. More particularly, the geometric criterion is based on whether Tr is of a size relative to Tw such that the read head can obtain accurate positioning information from seamless untrimmed servo patterns at all transducer radial positions, or whether seamed trimmed servo patterns are needed. According to the defined geometric criterion, selection of the seamless untrimmed servo pattern is conditioned on Tr being of a size relative to Tw such that the read head will encounter a radial edge portion of at least one servo burst in a servo sector at all radial positions of the read head relative to a track centerline.

The foregoing encompasses the two scenarios described above wherein the servo track width is either very narrow or very wide. In particular, selection of a seamless untrimmed servo pattern is conditioned on Tr being of a size relative to Tw such that the read head is wide enough to span a radially extending gap between the servo bursts of any servo burst pair when the read head is positioned over a track centerline. Selection of a seamless untrimmed servo pattern is further conditioned on Tr being of a size relative to Tw such that the read head is not saturated by either servo burst of any servo burst pair when the read head is offset ¼ track from a track centerline. Combining these two requirements, it may be said that selection of a seamless untrimmed servo pattern is conditioned on Tr being large enough to both (1) span a burst gap when the read head is positioned over a track centerline and (2) span an edge of a servo burst when the read head is offset ¼ track from a track centerline.

Figure 10:
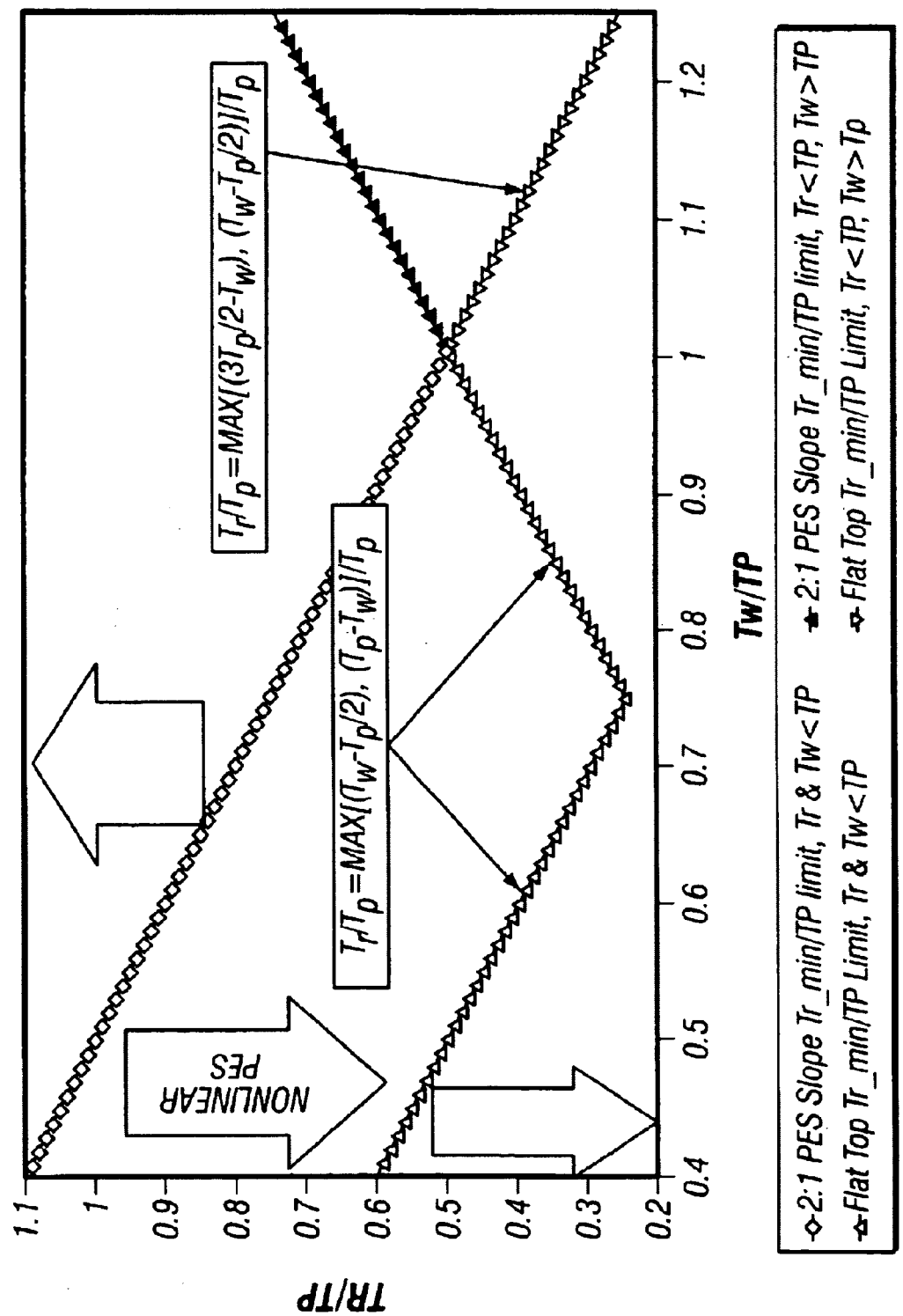
FIG. 10 is a graph showing read head requirements for PES linearity as a function of read track width Tr, write head track width Tw and track pitch Tp.

Turning now to FIG. 10, a graph is shown that defines the above-described geometric criterion in numerical terms. The graph plots read head track width Tr normalized to track pitch Tp (normalized read head track width Tr/Tp) against write head track width Tw normalized to track pitch Tp (normalized write head track width Tw/Tp). The lower curve in the graph corresponds to the minimum read head track width Tr at which a seamless untrimmed servo pattern can be used without flat topping. This "flat top" curve has two inflection points, one at Tw/Tp=0.75, and the other at Tw/Tp=1. When Tw/Tp<=0.75, the flat top curve is defined by the relationship Tr/Tp=(Tp−Tw)/Tp. When 0.75<=Tw/Tp<=1, the flat top curve is defined by Tr/Tp=(Tw−Tp/2)/Tp. Combining these equations, it may be said that for all Tw/Tp<=1, the minimum read head track width required to avoid flat topping is given by the relationship Tr/Tp=max [Tw−Tp/2), (Tp−Tw)]/Tp. When Tw/Tp>=1, the minimum read head track width required to avoid flat topping is given by the relationship Tw/Tp=(3Tp/2−Tw)/Tp.

Simplification of the foregoing relationships reveals how they correspond to the generalized geometric criterion set forth above.

For Tw/Tp<=0.75, the relationship Tr/Tp=(Tp−Tw)/Tp becomes:

Tr=Tp−Tw, which is the same as Tr+Tw=Tp.

This relationship corresponds to the case where Tw is small and the read head needs to span the gap between adjacent servo bursts when positioned at the track centerline. It can be seen from FIG. 9c that the gap will always be spanned by the read head whenever the combined track width of the read and write heads (Tr+Tw) equals the track pitch Tp.

For 0.75<=Tw/Tp<=1, the relationship Tr/Tp=(Tw−Tp/2)/Tp becomes:

Tr=Tw−0.5Tp, which is the same as Tw−Tr 0.5Tp.

This relationship corresponds to the case where Tw is large, but not larger than Tp. The read head needs to span an edge of a servo burst when offset ¼ track from the track centerline. It can be seen from FIG. 9d that this condition is satisfied whenever the differential between the read and write head track widths is not more than ½ track pitch.

For Tw/Tp>=1, the relationship Tr/Tp=(3Tp/2−Tw)/Tp becomes:

Tr=1.5Tp−Tw, which is the same as Tr+Tw=1.5Tp.

This relationship corresponds to the case where Tw is larger than the track pitch, which is typically undesirable but is considered nonetheless for the sake of completeness. The large Tw creates a situation where adjacent burst pairs overlap one another. This helps the situation above where the read head is offset ¼ track from the track centerline and needs to be large enough so as not to be saturated by a servo burst. Thus, as shown in FIG. 10, the required value of Tp decreases accordingly. In FIG. 9d, the ¼ track offset condition is shown for the condition where Tw=Tp and Tr needs to be 0.5 Tp (per the above). Note that if the bottom of the A burst is extended downwardly (while the top of the B burst is extended upwardly) to fit the case where Tw>1, the read head track width Tr no longer needs to be 0.5 Tp to pick up burst A's lower edge and avoid a flat topping saturation condition. Instead, the read head will avoid flat topping whenever the combined track width of the read and write heads (Tr+Tw) equals 1.5 Tp.

In addition to defining a flat top curve, FIG. 10 also shows a "linearity" curve for determining when a read head will produce a linear response, and conversely, when nonlinear compensation of servo signals needs to be performed. The linearity curve is the upper curve in FIG. 10. Read heads that fall above the linearity curve will produce linear PES signals. Read heads that fall below the linearity curve (and above the flat top curve) will produce nonlinear PES signals and may require nonlinearity compensation. Various linearization processes are available to provide such compensation. Insofar as such processes are generally known, they will not be discussed herein.

The linearity curve of FIG. 10 has one point of inflection at Tw/Tp=1. For Tw/Tp<=1, the equation of the linearity curve is given by Tr/Tp=(3Tp/2−Tw)/Tp. For Tw/Tp>=1, the equation of the linearity curve is given by Tr/Tp=(Tw−Tp/2)/Tp. Thus, for any point on the linearity curve, the minimum read head track width Tr needed to provide a linear response if given by the relationship Tr/Tw=max [(3Tp/2−Tw), (Tw−Tp/2)]/Tp. Both of these equations have been discussed above in connection with the flat top curve, where they were used at different Tw/Tp intervals to determine the read head track width required to avoid flat topping with seamless untrimmed servo bursts. Thus, it was shown that the equation Tr/Tp=(3Tp/2−Tw)/Tp corresponds to a condition where Tr+Tw=1.5 Tp. It was further shown that the equation (Tw−Tp/2)/Tp corresponds to a condition where Tw−Tr=0.5 Tp.

The foregoing linearity conditions are designed to insure that the read head track width (Tr) is large enough so that the read head spans both edges of a pair of adjacent servo bursts that define a burst pair centerline at all transducer positions (i.e., from the track centerline to a position wherein the read head is offset ¼ track from the track centerline). In other words, the read head will always lie over both servo bursts of at least one servo burst pair in a servo sector. When this requirement is satisfied, any radial movement of the read head will correspond to a decrease in signal strength read from one servo burst and a corresponding increase in signal strength read from the other servo burst. This produces a linear PES signal over the radial range of motion of the transducer across the track. The linearity condition will fail if the read head track width is small enough so that the read head can move beyond one of the burst edges, even though it still sees the other burst edge. In this condition, the read head will no longer obtain a signal from one of the bursts and all positioning will be based on signal strength changes relative to the other burst. This changes the slope of the PES curve such that the PES signal is no longer linear over the range of motion of the transducer across the track.

Figure 11:
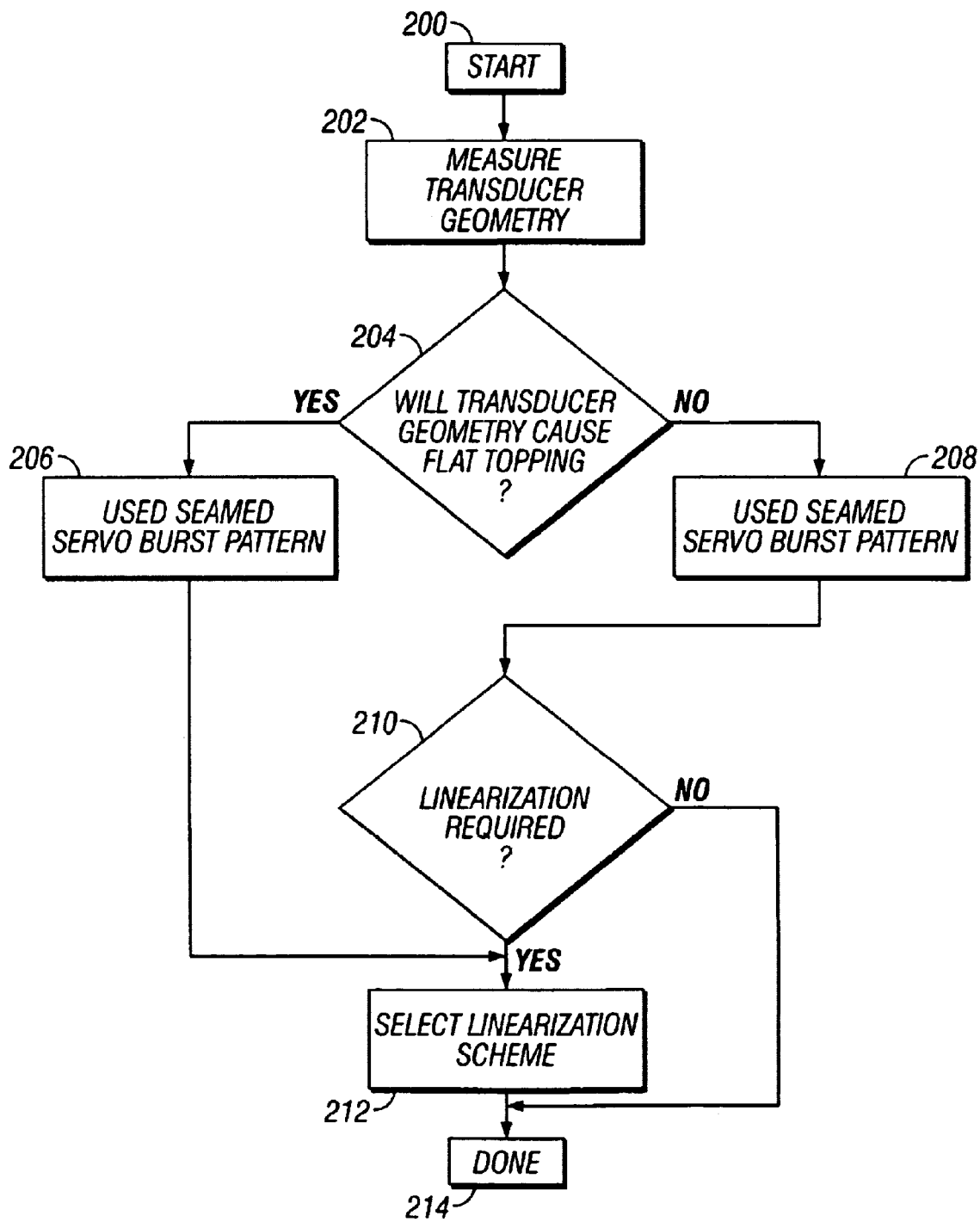
FIG. 11 is a flow diagram showing a servo pattern selection method in accordance with the invention.

FIG. 11 graphically illustrates the above-described process for selecting servo burst types and determining whether PES linearization is to be performed. Starting in step 200, the transducers to be incorporated in a disk drive are measured to determine their geometric characteristics in step 202. In step 204, a test is made relative to each transducer to determine whether it can be used with a seamless untrimmed servo pattern without flat topping. If the transducer geometry is such that a flat top condition will result, the transducer is designated for use with a seamed trimmed servo burst pattern in step 206. If the transducer geometry is such that a flat top condition will result, the transducer is designated for use with a seamless untrimmed servo burst pattern in step 208. In step 210, a test is made relative to each transducer to determine whether linearization processing is needed. If it is, a linearization scheme is selected in step 212 and the process completes in step 214. Step 214 is also reached if it is determined in step 210 that no linearization scheme is required.

Servo writing in accordance with the invention is preferably performed in a manner that does not add undue time or resources to conventional servo write manufacturing processes. In a conventional servo write operation, a disk drive's transducers are used to write the servo sectors by asserting servo write signals on the drive's write channel while an actuator positioning mechanism is connected to the drive's actuator after being passed through a temporary opening in the drive housing. Two or more transducers are preferably driven to write their servo sectors simultaneously in what is known as a "gang write" operation.

If a gang write operation is used to enable writing the servo sectors for two or more transducers, there are limitations on the ability to write distinct servo sectors on a transducer by transducer basis unless additional revolutions are taken to write the file or modifications to the write circuitry are made that allow different transducers to write different servo information at the same time. Using a two-transducer gang write, one additional revolution per track would allow all servo sectors to be written in the desired configuration. However, the one additional revolution per driver would add significant capital cost to a typical manufacturing program.

Instead of using a gang write technique, it would be possible to write servo sectors non-simultaneously in a staggered fashion using one or more transducers at a time. This would allow the servo pattern to be customized on a transducer by transducer basis. Another approach would be to add a feature to the write circuitry of the drive that allows the use of two write gate lines during servo writing, one seamed and the other seamless. This would allow the servo sectors to be written simultaneously. Register bits in the drive controller could then be used to define which transducers get which write gate during servo writing. An alternative to adding a second write gate line would be to have a write gate bit in one of the drive controller registers that is accessible while in the servo write mode. The write gate bit would turn on the write gate until the bit is reset. Another register would select which heads use the write gate line and which heads use the write gate bit. Preferably, seamless untrimmed servo bursts would be written by the write gate line, which needs to toggle in order to write such bursts within a servo sector. The seamed trimmed servo bursts would then be written via the write gate bit.

By way of example, assume there is an eight-head disk file with head numbers 0–7, and it is desired to write seamed trimmed servo bursts for heads 3 and 5 and to write seamless untrimmed servo bursts for the remaining heads. The write gate selection register bits would be set to 11101011 (0–2 seamless, 3 seamed, 4 seamless, 5 seamed and 6–7 seamless). The servo write sequence used to write a servo sector might then be as follows:

1. Enable write gate bits to turn on write gate to heads 3 and 5;
2. Turn on seamless write gate and toggle appropriately as sector is written (directed to other 6 heads);
3. Turn off seamless write gate to the 6 seamless heads; and
4. Reset write gate bit to turn off write gate to heads 3 and 5.

Accordingly, an exemplary system and method for writing distinct servo patterns in a data storage device have been disclosed. The disclosed approach of customizing the servo pattern based a geometric criterion associated with each transducer allows a majority of transducers to use seamless untrimmed servo bursts for good TMR reduction but without the associated yield loss caused by transducers that do not work well with seamless untrimmed servo patterns. More generally, each servo pattern used with a particular transducer can be customized to any measurable transducer characteristic, including a geometric criterion such as track width, an operating characteristic such as frequency response, or otherwise. Theoretically, there could be a unique servo pattern for each transducer. Thus, while various embodiments of the invention have been described, it should be apparent that many variations and alternative embodiments could be implemented in accordance with the invention. It will be understood, therefore, that the invention is not to be in any way limited except in accordance with the spirit of the appended claims and their equivalents.

What is claimed is:

1. A method for writing distinct servo patterns in a data storage device, comprising writing servo patterns of a first type for transducers of said data storage device having a defined transducer characteristic and writing servo patterns of a second type for transducers that do not have said transducer characteristic.

2. A method in accordance with claim 1 wherein said transducer characteristic is based on ability of said transducers to obtain accurate positioning when reading servo patterns of said first type.

3. A method in accordance with claim 1 wherein said transducer characteristic is a geometric criterion based on a track width (Tr) of a read head portion of a transducer relative to a track width (Tw) of a write head portion of the transducer that is used to write said servo patterns.

4. A method in accordance with claim 3 wherein said geometric criterion is based on whether Tr is of a size relative to Tw such that said read head can obtain accurate positioning information from servo patterns of said first type at all transducer radial positions.

5. A method in accordance with claim 3 wherein said servo patterns of said first type comprise pairs of adjacent servo bursts recorded in servo sectors, wherein selection of said first servo pattern type is conditioned on Tr being of a size relative to Tw such that said read head encounters a radial edge portion of at least one servo burst in a servo sector at all radial positions of said read head relative to a track centerline, and wherein selection of said second servo pattern type is based on said condition for selection of said first servo pattern type not being satisfied.

6. A method in accordance with claim 3 wherein said servo patterns of said first type comprise pairs of adjacent servo bursts, wherein selection of said first servo pattern type is conditioned on Tr being of a size relative to Tw such that said read head is wide enough to span a radially extending gap between the servo bursts of a servo burst pair when said read head is positioned over a track centerline, and wherein selection of said second servo pattern type is based on said condition for selection of said first servo pattern type not being satisfied.

7. A method in accordance with claim 3 wherein servo patterns of said first type comprise pairs of adjacent servo bursts, wherein selection of said first servo pattern type is conditioned on Tr being of a size relative to Tw such that said read head is not saturated by either servo burst of a servo burst pair when said read head is offset one quarter track from a track centerline, and wherein selection of said second servo pattern type is based on said condition for selection of said first servo pattern type not being satisfied.

8. A method in accordance with claim 3 wherein servo patterns of said first type comprise pairs of adjacent servo bursts that are radially spaced by a radially extending gap centered on a track centerline, wherein selection of said first servo pattern type is conditioned on Tr being large enough to both (1) span said gap when said read head is positioned over a track centerline and (2) span an edge of one of said servo bursts when said read head is offset one quarter track from a track centerline, and wherein selection of said second servo pattern type is based on said condition for selection of said first servo pattern type not being satisfied.

9. A method in accordance with claim 3 wherein servo patterns of said first type comprise pairs of adjacent servo bursts and selection of said first servo pattern type is conditioned on Tr and Tw being of a size relative to a track pitch (Tp) such that Tr/Tp is larger than max[Tw−Tp/2), (Tp−Tw)]/Tp for Tw/Tp<=1 and (3Tp/2−Tw)/Tp for Tw/Tp>1, and wherein selection of said second servo pattern type is based on said condition for selection of said first servo pattern type not being satisfied.

10. A method in accordance with claim 1 wherein said first servo pattern type is a seamless untrimmed PES pattern and said second servo pattern type is a seamed PES pattern.

11. A method in accordance with claim 1 wherein said first servo pattern type comprises adjacent servo bursts each having a burst edge proximate a track centerline, and wherein nonlinear compensation of servo signals read from said first servo pattern type is provided for any transducer having a read head of track width (Tr) that is not large enough to satisfy a condition of spanning both respective burst edges of said servo bursts at all transducer positions from a track centerline to a position wherein said read head is offset one quarter track from said track centerline.

12. A method in accordance with claim 11 wherein linear compensation is used if Tr is large enough to satisfy said condition.

13. A method in accordance with claim 12 wherein said condition is satisfied when Tr and the track width (Tw) of a write head portion of a transducer are of a size relative to a track pitch (Tp) such that Tr/Tp is larger than max[3Tp/2−Tw), (Tw−Tp/2)]/Tp.

14. A data storage system comprising:
 data storage media providing plural storage media surfaces adapted to store data in a series of adjacent tracks;
 a transducer associated with each of said storage media surfaces, each transducer having a read head and a write head for reading and writing data on an associated storage media surface;
 servo patterns written on said storage media surfaces by associated ones of said write heads;
 said servo patterns including a first servo pattern type for servo patterns associated with a first type of said transducers having a defined transducer characteristic and a second servo pattern type for servo patterns associated with a second type of said transducers that do not have said transducer characteristic.

15. A system in accordance with claim 14 wherein said transducer characteristic is based on ability of said transducers to obtain accurate positioning when reading servo patterns of said first type.

16. A system in accordance with claim 14 wherein said transducer characteristic is a geometric criterion based on a track width (Tr) of a read head portion of a transducer relative to a track width (Tw) of a write head portion of the transducer that is used to write said servo patterns.

17. A system in accordance with claim 16 wherein said geometric criterion is based on whether Tr is of a size relative to Tw such that said read head can obtain accurate positioning information from servo patterns of said first type at all transducer radial positions.

18. A system in accordance with claim 16 wherein said servo patterns of said first type comprise pairs of adjacent servo bursts recorded in servo sectors, wherein selection of said first servo pattern type is conditioned on Tr being of a size relative to Tw such that said read head encounters a radial edge portion of at least one servo burst in a servo sector at all radial positions of said read head relative to a track centerline, and wherein selection of said second servo pattern type is based on said condition for selection of said first servo pattern type not being satisfied.

19. A system in accordance with claim 16 wherein said servo patterns of said first type comprise pairs of adjacent servo bursts, wherein selection of said first servo pattern type is conditioned on Tr being of a size relative to Tw such that said read head is wide enough to span a radially extending gap between the servo bursts of a servo burst pair when said read head is positioned over a track centerline, and wherein selection of said second servo pattern type is based on said condition for selection of said first servo pattern type not being satisfied.

20. A system in accordance with claim 16 wherein servo patterns of said first type comprise pairs of adjacent servo bursts, wherein selection of said first servo pattern type is conditioned on Tr being of a size relative to Tw such that said read head is not saturated by either servo burst of a servo burst pair when said read head is offset one quarter track from a track centerline, and wherein selection of said second servo pattern type is based on said condition for selection of said first servo pattern type not being satisfied.

21. A system in accordance with claim 16 wherein servo patterns of said first type comprise pairs of adjacent servo bursts that are radially spaced by a radially extending gap centered on a track centerline, wherein selection of said first servo pattern type is conditioned on Tr being large enough to both (1) span said gap when said read head is positioned over a track centerline and (2) span an edge of one of said servo bursts when said read head is offset one quarter track from a track centerline, and wherein selection of said second servo pattern type is based on said condition for selection of said first servo pattern type not being satisfied.

22. A system in accordance with claim 16 wherein servo patterns of said first type comprise pairs of adjacent servo bursts and selection of said first servo pattern type is conditioned on Tr and Tw being of a size relative to a track pitch (Tp) such that Tr/Tp is larger than max[Tw−Tp/2), (Tp−Tw)]/Tp for Tw/Tp<=1 and (3Tp/2−Tw)/Tp for Tw/Tp>1, and wherein selection of said second servo pattern type is based on said condition for selection of said first servo pattern type not being satisfied.

23. A system in accordance with claim 14 wherein said first servo pattern type is a seamless untrimmed PES pattern and said second servo pattern type is a seamed PES pattern.

24. A system in accordance with claim 14 wherein said first servo pattern type comprises adjacent servo bursts each having a burst edge proximate a track centerline, and wherein nonlinear compensation of servo signals read from said first servo pattern type is provided for any transducer having a read head of track width (Tr) that is not large enough to satisfy a condition of spanning both respective burst edges of said servo bursts at all transducer positions from a track centerline to a position wherein said read head is offset one quarter track from said track centerline.

25. A system in accordance with claim 24 wherein linear compensation is used if Tr is large enough to satisfy said condition.

26. A system in accordance with claim 25 wherein said condition is satisfied when Tr and the track width (Tw) of a write head portion of a transducer are of a size relative to a track pitch (Tp) such that Tr/Tp is larger than max[3Tp/2−Tw), (Tw−Tp/2)]/Tp.

27. A method for servo writing distinct servo patterns on a data storage device having plural transducers accessing plural recording surfaces on plural rotating disks, comprising:

performing a first servo write operation of writing servo patterns of a first type using one or more transducers of said data storage device having a defined transducer characteristic;

performing a second servo write operation of writing servo patterns of a second type using one or more transducers of said data storage device that do not have said transducer characteristic; and said first and second servo write operations being performed either (1) simultaneously in a single disk revolution so that said servo patterns of said second type are circumferentially non-staggered relative to said servo patterns of said first type, or (2) non-simultaneously in a single disk revolution so that said servo patterns of said second type are circumferentially staggered relative to said servo patterns of said first type.

28. A method in accordance with claim 27 wherein said first and second servo write operations are performed simultaneously in a single disk revolution so that said servo patterns of said second type are circumferentially non-staggered relative to said servo patterns of said first type.

29. A method in accordance with claim 27 wherein said first and second servo write operations are performed non-simultaneously in a single disk revolution so that said servo patterns of said second type are circumferentially staggered relative to said servo patterns of said first type.

* * * * *